United States Patent
Neupärtl et al.

(10) Patent No.: US 8,539,448 B2
(45) Date of Patent: Sep. 17, 2013

(54) SYSTEM AND METHOD FOR AUTOMATICALLY TESTING A PROGRAM FOR SAFETY-RELATED AUTOMATION SYSTEMS

(75) Inventors: Heinrich Neupärtl, Lampertheim (DE); Mario Hörnicke, Landau (DE); Oliver Gramberg, Zürich (CH); Rainer Drath, Einhausen (DE); Yauheni Veryha, Mannheim (DE)

(73) Assignee: ABB AG, Mannheim (DE)

( * ) Notice: Subject to any disclaimer, the term of this patent is extended or adjusted under 35 U.S.C. 154(b) by 43 days.

(21) Appl. No.: 13/246,338

(22) Filed: Sep. 27, 2011

(65) Prior Publication Data

US 2012/0036499 A1  Feb. 9, 2012

Related U.S. Application Data

(63) Continuation of application No. PCT/EP2010/001503, filed on Mar. 11, 2010.

(30) Foreign Application Priority Data

Mar. 27, 2009  (DE) .......................... 10 2009 014 698

(51) Int. Cl.
*G06F 9/44* (2006.01)
*G06F 9/45* (2006.01)

(52) U.S. Cl.
USPC ............................ 717/124; 717/127; 717/128

(58) Field of Classification Search
USPC ................................................ 717/124–130
See application file for complete search history.

(56) References Cited

U.S. PATENT DOCUMENTS

| | | | |
|---|---|---|---|
| 6,071,316 A * | 6/2000 | Goossen et al. .............. | 717/126 |
| 6,353,924 B1 * | 3/2002 | Ayers et al. .................... | 717/128 |
| 6,546,547 B1 * | 4/2003 | Runyan et al. ................ | 717/124 |
| 6,634,019 B1 * | 10/2003 | Rice et al. ...................... | 717/127 |
| 7,003,765 B1 | 2/2006 | Venkatasubramanian et al. | |
| 7,027,880 B2 * | 4/2006 | Izzo et al. ....................... | 700/21 |
| 7,152,227 B1 | 12/2006 | Bloom | |
| 7,154,497 B2 * | 12/2006 | Allor ............................. | 345/419 |

(Continued)

FOREIGN PATENT DOCUMENTS

DE  10 2007 043214 A1  3/2009

OTHER PUBLICATIONS

Papailiopoulou et al, "Automatic test generation for Iustre/Scade programs", IEEE, pp. 517-520, 2008.*

(Continued)

*Primary Examiner* — Anil Khatri
(74) *Attorney, Agent, or Firm* — Buchanan Ingersoll & Rooney PC

(57) ABSTRACT

A method and system are provided for automatically testing a program for automation systems (e.g., programmable logic controllers) with regard to maintaining programming guidelines for program design for automation systems. A copy of at least part of a safety-related program is obtained from a development system for automation systems as a copy to be tested. The program copy to be tested is loaded into a test device for testing programs. The test device has access to programming guidelines for program testing. The test device automatically performs the program test with regard to maintaining programming guidelines, and outputs the test result.

18 Claims, 2 Drawing Sheets

(56) References Cited

U.S. PATENT DOCUMENTS

| | | | |
|---|---|---|---|
| 7,216,339 B2 * | 5/2007 | Simkins | 717/126 |
| 7,340,725 B1 * | 3/2008 | Robinson et al. | 717/124 |
| 7,409,388 B2 * | 8/2008 | Dunki et al. | 717/124 |
| 7,421,680 B2 * | 9/2008 | DeLine et al. | 717/126 |
| 7,584,455 B2 * | 9/2009 | Ball | 717/124 |
| 7,707,557 B1 * | 4/2010 | Nikolov | 717/130 |
| 7,716,641 B2 * | 5/2010 | McHugh et al. | 717/124 |
| 7,730,453 B2 * | 6/2010 | Swafford | 717/124 |
| 7,770,153 B2 * | 8/2010 | Chilimbi et al. | 717/127 |
| 8,104,021 B2 * | 1/2012 | Erlingsson et al. | 717/126 |
| 8,117,600 B1 * | 2/2012 | Roeck et al. | 717/128 |
| 8,122,436 B2 * | 2/2012 | Costa et al. | 717/128 |
| 8,276,123 B1 * | 9/2012 | Deng et al. | 717/125 |
| 2004/0260940 A1 | 12/2004 | Berg et al. | |
| 2007/0234304 A1 | 10/2007 | Berg et al. | |
| 2008/0263525 A1 | 10/2008 | Berg et al. | |

OTHER PUBLICATIONS

Candea et al, "Automated software testing as a service", ACM, pp. 155-160, 2010.*

Kim et al, "Safety assured development of the GPCA infusion pump software", ACM 155-165, 2011.*

Auguston et al, "Environmental behavior models for scenario generation and tetsing automation", ACM, pp. 1-7, 2005.*

International Search Report (PCT/ISA/210) issued on Aug. 9, 2010, by Japanese Patent Office as the International Searching Authority for International Application No. PCT/EP2010/001503.

D. Engler et al., "Checking System Rules Using System-Specific, Programmer-Written Compiler Extensions", 4th Symposium on Operation Systems Design and Implementation, Oct. 23-25, 2000, San Diego, CA (16 pages).

* cited by examiner

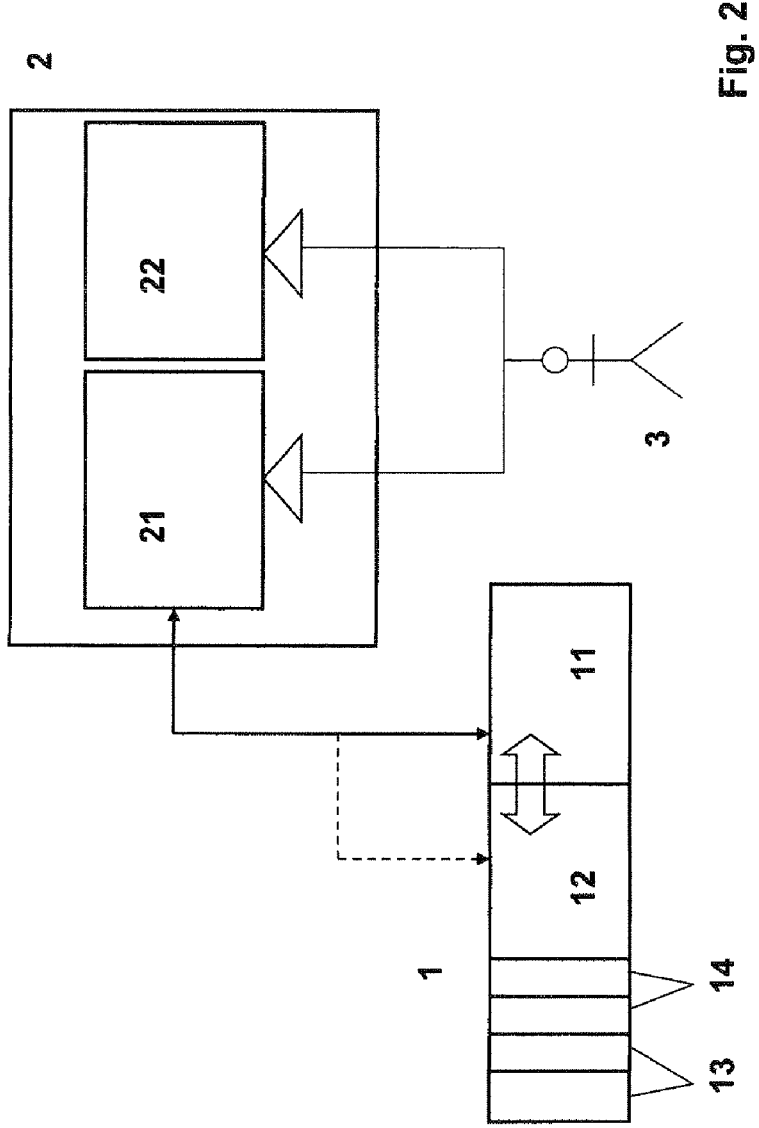

SYSTEM AND METHOD FOR AUTOMATICALLY TESTING A PROGRAM FOR SAFETY-RELATED AUTOMATION SYSTEMS

RELATED APPLICATION

This application claims priority as a continuation application under 35 U.S.C. §120 to PCT/EP 2010/001503, which was filed as an International Application on Mar. 11, 2010 designating the U.S., and which claims priority to German Application No. 10 2009 014 698.9 filed in Germany on Mar. 27, 2009. The entire contents of these applications are hereby incorporated by reference in their entireties.

FIELD

The present disclosure relates to a method and a system for automatically testing a program for at least partially safety-related automation systems, such as testing safety-related programmable logic controllers for compliance with guidelines, for example.

BACKGROUND INFORMATION

In order to certify an automation system (e.g., a safety-related automation system) as easily and cost-effectively as possible, as many pre-certified components as possible are used when creating such a system. These pre-certified components can be, for example: (i) hardware components such as a programmable logic controller, input/output modules, bus systems, sensors, and actuators; (ii) firmware on intelligent components such as the programmable logic controller; (iii) software components such as a development system for programs for automation systems; (iv) processes for developing a safety-related automation system; and (v) entities which carry out such a process.

The program in the programmable logic controller (e.g., the safety-related programmable logic controller) is the only component of a safety-related automation system which is dependent on the planned use and therefore cannot be prefabricated and/or pre-certified.

The practice of certifying the program in the safety-related programmable logic controller is facilitated if the structure and contents of the program are designed in such a manner that the certifying body can understand the method of operation of the program with as little effort as possible. This can be achieved by virtue of the fact that the possibilities provided by the programming language used for programmable logic controllers are restricted when used for a safety-related automation system.

Such restrictions can be represented in the form of guidelines which then need to be heeded when creating the program for the safety-related programmable logic controller. However, the test for compliance with such guidelines for designing programs for safety-related programmable logic controllers is a time-consuming activity and is susceptible to errors, for the development personnel or the body certifying the safety-related automation system.

The possibility of carrying out an automatic program test has existed for decades for different programming languages in the field of software development. In this case, a distinction is made between different types of tests, for example: (i) a test for compliance with particular rules, such as a test of syntax or type compatibility; (ii) a test for correctness, such as a test against field index overflow, pointer overflow, memory overflow, endless loops, memory which has not been allocated or has not been released, and variables which have not been initialized or unsafe type conversions; and (iii) a test of run time properties, such as performance or stress tests.

It is known to implement program testing means in a development system for safety-related programs in safety-related programmable logic controllers. This procedure leads to time-consuming software development and is associated with high costs since the development system for use in safety-related automation systems is pre-certified and the integration of the program testing means in the development system constitutes a change to the development system, which makes it necessary to certify the latter again.

SUMMARY

An exemplary embodiment of the present disclosure provides a method for automatically testing a program for a safety-related automation system having at least one safety-related programmable logic controller for compliance with programming guidelines pertaining to designing programs for the safety-related programmable logic controller. The exemplary method includes obtaining at least part of a safety-related program from a development system for automation systems. The safety-related program is stored in a programming environment for creating a safety-related program in the development system. The exemplary method also includes loading the obtained safety-related program into a test device for testing safety-related programs. The test device has access to guidelines for designing programs for safety-related programmable logic controllers. In addition, the exemplary method includes automatically testing the loaded safety-related program in the test device for compliance with the programming guidelines for designing programs for safety-related programmable logic controllers, and outputting results of the testing from the test device.

An exemplary embodiment of the present disclosure provides a system for automatically testing a program for a safety-related automation system having at least one safety-related programmable logic controller for compliance with programming guidelines pertaining to designing programs for the safety-related programmable logic controller. The exemplary system includes a development computer configured to interact with a safety-related automation system. The development computer includes a development system having a programming environment for creating a safety-related program, and a test device configured to load and test the safety-related program. The test device is configured to automatically test the safety-related program for compliance with programming guidelines for designing programs for safety-related programmable logic controllers, and to output a result the test.

BRIEF DESCRIPTION OF THE DRAWINGS

Additional refinements, advantages and features of the present disclosure are described in more detail below with reference to exemplary embodiments illustrated in the drawings, in which:

FIG. 2 is an arrangement for carrying out the method according to an exemplary embodiment of the present disclosure.

DETAILED DESCRIPTION

Figure 1:
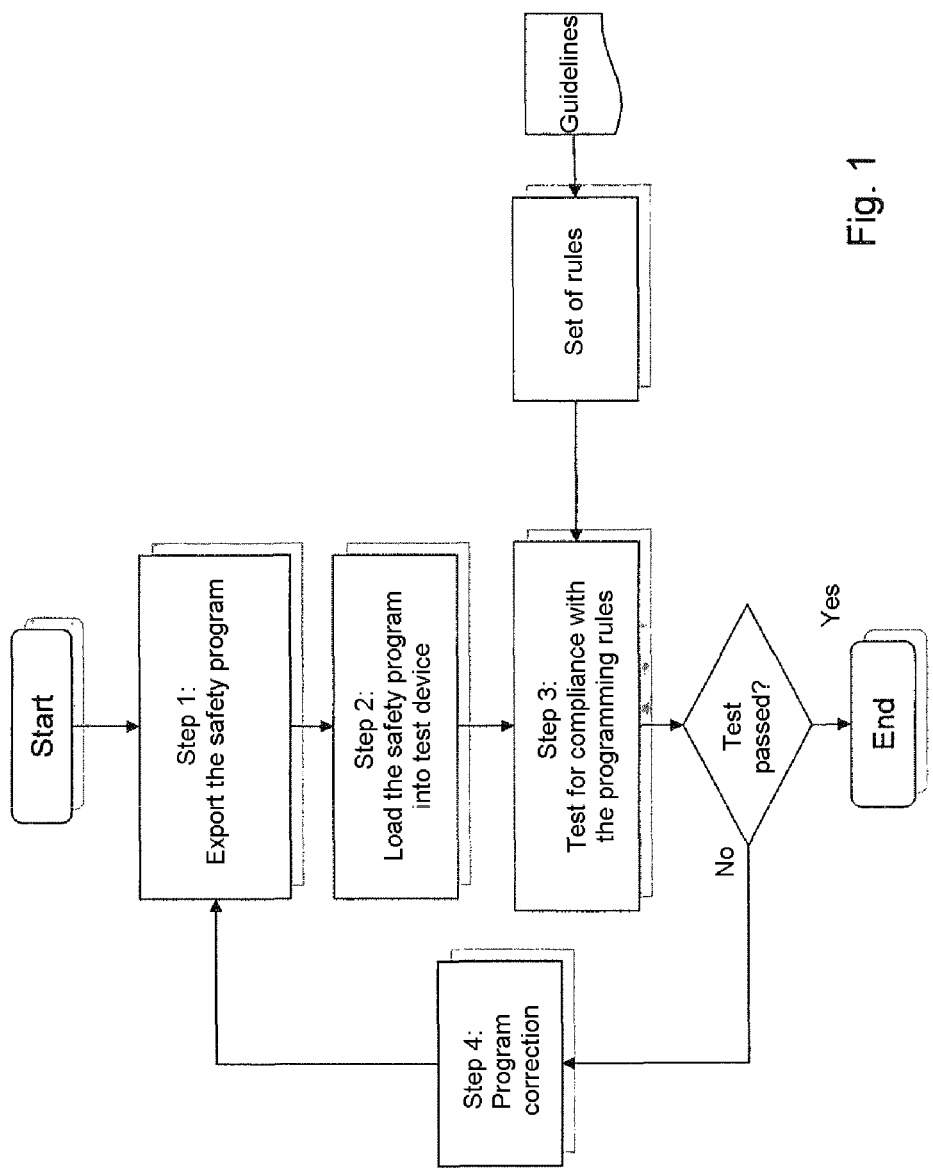
FIG. 1 is a flowchart illustrating steps of a method according to an exemplary embodiment of the present disclosure.

Exemplary embodiments of the present disclosure provide a method and system for automatically testing a program for automation systems, such as safety-related automation systems, for compliance with guidelines, rules and specifications (also referred to as programming guidelines), for example, programming guidelines for designing programs for programmable logic controllers, such as safety-related programmable logic controllers.

An exemplary embodiment of the present disclosure provides a method for automatically testing a program for safety-related automation systems, for example, safety-related programmable logic controllers.

Exemplary embodiments of the present disclosure provide the feature of automatically testing control programs or program parts of the automation system for compliance with programming guidelines, for example guidelines, rules and specifications, for designing programs for programmable logic controllers (e.g., safety-related programmable logic controllers) outside a development environment for safety software (also referred to as a safety-related program). In accordance with an exemplary embodiment, the automatic test may relate to safety-related control programs or program parts of a safety-related automation system.

A change to the development system can be advantageously avoided if, for example, the guidelines for designing programs for safety-related programmable logic controllers are initially integrated or subsequently amended because the safety-related programmable logic controller is intended to be certified for a higher safety integrity level, for example according to the IEC 61508 standard, that is to say is intended to be adapted to different levels of safety applications.

FIG. 1 shows a flowchart of a method for automatically testing a program for safety-related automation systems. In step 1, a copy of a program (also referred to as the original program) is exported from a development system for an exemplary safety-related automation system. According to a second step, this program copy (also referred to as the safety program) is loaded into another device (also referred to as a test device herein). This test device is set up to test a program and contains software which is configured for testing a program—to be carried out in a third step—and is configured to test a given set of guidelines for designing programs for safety-related programmable logic controllers (also referred to as programming guidelines below). The above-described test device includes a processor configured to execute the software for testing a program and perform the operative functions as described herein. The test device also includes a non-transitory computer-readable recording medium (e.g., ROM, hard disk drive, flash memory, optical memory, etc.) configured to record thereon the software executed by the processor of the test device.

The programming guidelines may be in a machine-readable form and are then interpreted during the test program run.

The program which is created in the development system and needs to be tested may be, for example, in a programming language according to the IEC 61131 standard, for example, in the form of a structured-text program, in the form of a function block diagram or in the form of a ladder diagram.

If the test result states that the program copy to be tested is free of errors according to the programming guidelines, for example, the guidelines for designing programs for safety-related programmable logic controllers, this is output to the development system and/or the programmer and the procedure is thus ended.

If errors which contravene the guidelines for designing programs for safety-related programmable logic controllers are found, these errors are marked or indicated and/or displayed. In accordance with an exemplary embodiment of the present disclosure, the erroneous program is now revised or corrected. This operation is illustrated as step 4 in FIG. 1. After the original program has been revised in the development system, this program is exported again and is loaded into the test device.

The repetition procedure is carried out either until contravention of the programming guidelines by the program to be tested is no longer determined or until only contravention of those guidelines which are of minor importance in the present case is determined, with the result that no delay in the certification sought can be expected as a result and the new program version can be used in the safety-related automation system. Contravention of those programming guidelines which are of minor importance may be determined at the start of the method according to the disclosure.

According to an exemplary embodiment of the method, it is possible to dispense with the first step, that is to say the export of a copy of the program from the development system, if the test device is designed to directly locate the safety program to be tested in the development system and to load it automatically, that is to say without an additional export step.

According to an exemplary embodiment of the method, the first step, that is to say the export of a program copy, is dispensed with. In this case, the test device is set up to directly access the safety program to be tested in the development system and thus to test the program inside the development system. In this case, the test device does not change the program inside the development system unless a user causes a modification.

FIG. 2 shows, by way of example, a system or an arrangement for carrying out the features of the exemplary method according to the present disclosure as described above. In this case, a safety-related automation system 1 interacts with a development computer 2. The safety-related automation system 1 contains a safety-related programmable logic controller 11 and a non-safety-related programmable logic controller 12 which communicates with the safety-related programmable logic controller 11. Safety-related input/output devices 13 and non-safety-related input/output devices 14 are also present and are connected to the controllers 11 and 12 by means of a data transmission system (e.g., wired or wireless).

The development computer 2 contains a development system 21 having a programming environment for creating a safety-related program (also referred to as safety software) and a test device 22 for testing the safety software. A programmer 3 has access both to the development system 21 and to the test device 22. The development computer 2 can be connected to the safety-related programmable logic controller 11 and/or to the non-safety-related programmable logic controller 12. The method of operation of the arrangement illustrated in FIG. 2 then corresponds to the sequence described using FIG. 1.

The exemplary method according to the disclosure and the corresponding system not only relieve a programmer of the time-consuming program test but are also reaction-free insofar as the test device does not modify the original program in the development system. This is the prerequisite for the development system still being able to be used as pre-certified without further testing in the development of the program for the safety-related system.

Another advantage is that it is possible to flexibly adapt the programming guidelines for designing programs for programmable logic controllers, for example, safety-related programmable logic controllers, to a respectively required SIL (Safety Integrity Level).

It is advantageous to be able to modify the test device, for example, the guidelines to be tested for designing programs for safety-related programmable logic controllers, without having to change the development system in the process and therefore without having to certify the latter again.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for automatically testing a program for a safety-related automation system having at least one safety-related programmable logic controller for compliance with programming guidelines pertaining to designing programs for the safety-related programmable logic controller, a non-safety related programmable logic controller which communicates with the safety-related programmable logic controller, and safety related input/output devices and non-safety input/output devices which are connected to the controllers, the method comprising:
    obtaining at least part of a safety-related program from a development system for automation systems, the safety-related program being stored in a programming environment for creating a safety-related program in the development system;
    loading the obtained safety-related program into a test device for testing safety-related programs, the test device having access to guidelines for designing programs for safety-related programmable logic controllers;
    automatically testing, by a processor of the testing device, the loaded safety-related program in the test device for compliance with the programming guidelines for designing programs for safety-related programmable logic controllers; and
    outputting results of the testing from the test device;
    wherein the programming guidelines are in machine-readable form and are interpreted by the processor of the test device during execution of the test of the safety-related program.

2. The method as claimed in claim 1, comprising:
    revising the safety-related program loaded in the test device when the safety-related program is identified as being erroneous during the test; and
    testing the revised safety-related program again in the test device until one of (i) there are no errors, and (ii) a remaining deviation from the programming guidelines is identified as being non-critical.

3. The method as claimed in claim 2, wherein the programming guidelines are in machine-readable form and are interpreted by the processor of the test device during execution of the test of the safety-related program.

4. The method as claimed in claim 2, wherein the obtaining of the safety-related program comprises directly locating the safety-related program in the development system and automatically loading the located safety-related program using the test device.

5. The method as claimed in claim 2, wherein the obtaining of the safety-related program comprises directly accessing the safety-related program in the development system using the test device, and
    wherein the testing of the safety-related program comprises testing the safety-related program inside the development system using the test device.

6. The method as claimed in claim 1, wherein the obtaining of the safety-related program comprises directly locating the safety-related program in the development system and automatically loading the located safety-related program using the test device.

7. The method as claimed in claim 1, wherein the obtaining of the safety-related program comprises directly accessing the safety-related program in the development system using the test device, and
    wherein the testing of the safety-related program comprises testing the safety-related program inside the development system using the test device.

8. The method as claimed in claim 1, wherein the obtaining of the safety-related program comprises exporting a copy of the safety-related program to the test device.

9. A system for automatically testing a program for a safety-related automation system having at least one safety-related programmable logic controller for compliance with programming guidelines pertaining to designing programs for the safety-related programmable logic controller, a non-safety related programmable logic controller which communicates with the safety-related programmable logic controller, and safety-related input/output devices and non-safety input/output devices which are connected to the controllers, the system comprising:
    a development computer configured to interact with a safety-related automation system,
    wherein the development computer includes a development system having a programming environment for creating a safety-related program, and a test device including a processor configured to load and test the safety-related program, and
    wherein the processor of the test device is configured to automatically test the safety-related program for compliance with programming guidelines for designing programs for safety-related programmable logic controllers, and to output a result the test; wherein the programming guidelines are in machine-readable form and configured to be interpreted by the processor of the test device during execution of the test of the safety-related program.

10. The system as claimed in claim 9, wherein the processor of the test device is configured to revise a copy of the safety-related program identified as being erroneous on the basis of the programming guidelines during the test, and to again test the revised copy of the safety-related program until one of (i) there are no errors, and (ii) a remaining deviation from the programming guidelines is identified as being non-critical.

11. The system as claimed in claim 10, wherein the processor of the test device, in loading the safety-related program, is configured to directly locate the safety-related program to be tested in the development system and automatically load the program.

12. The system as claimed in claim 11, wherein the programming guidelines are at least one of guidelines, rules and specifications for designing programs for programmable logic controllers.

13. The system as claimed in claim 10, wherein the processor of the test device, in loading the safety-related program, is configured to directly access the safety-related program to be tested in the development system and test the safety program.

14. The system as claimed in claim 13, wherein the programming guidelines are at least one of guidelines, rules and specifications for designing programs for programmable logic controllers.

15. The system as claimed in claim 10, wherein the programming guidelines are at least one of guidelines, rules and specifications for designing programs for programmable logic controllers.

16. The system as claimed in claim 10, wherein the development system is a pre-certified component.

17. The system as claimed in claim 9, wherein the processor of the test device, in loading the safety-related program, is configured to directly locate the safety-related program to be tested in the development system and automatically load the program.

18. The system as claimed in claim 9, wherein the processor of the test device, in loading the safety-related program, is configured to directly access the safety-related program to be tested in the development system and test the safety program.

* * * * *